United States Patent [19]

Bohen et al.

[11] Patent Number: 4,762,861

[45] Date of Patent: Aug. 9, 1988

[54] TETRAHALOPHTHALATE ESTERS AS FLAME RETARDANTS FOR POLYSTYRENE RESINS

[75] Inventors: Joseph M. Bohen, King of Prussia; Ronald F. Lovenguth, Doylestown, both of Pa.

[73] Assignee: Pennwalt Corporation, Philadelphia, Pa.

[21] Appl. No.: 115,211

[22] Filed: Oct. 30, 1987

[51] Int. Cl.[4] ............................................. C08J 9/14
[52] U.S. Cl. ...................................... 521/97; 521/139; 521/140; 521/146; 521/907; 524/288; 524/296
[58] Field of Search ................. 521/97, 139, 146, 907, 521/140; 524/288, 296

[56] References Cited

U.S. PATENT DOCUMENTS

| | | | |
|---|---|---|---|
| 4,098,704 | 7/1978 | Sandler | 427/393.3 |
| 4,298,517 | 11/1981 | Sandler | 524/296 |
| 4,397,977 | 8/1983 | Sandler | 524/288 |

Primary Examiner—Morton Foelak
Attorney, Agent, or Firm—E. Leigh Hunt

[57] ABSTRACT

Tetrahalophthalate esters are disclosed herein as flame retardant processing aids for polystyrene resins.

11 Claims, No Drawings

TETRAHALOPHTHALATE ESTERS AS FLAME RETARDANTS FOR POLYSTYRENE RESINS

BACKGROUND OF THE INVENTION

This invention relates to flame retardant compositions containing at least one tetrahalophthalate ester and a polystyrene resin. Additionally this composition may also contain one or more brominated and/or chlorinated compounds in an amount to provide additional flame retardancy to the polystyrene resins.

Sytrenic resins find extensive use in the manufacture of packaging material, refrigerator doors, air conditioner cases; machine housings, electrical equipment, toys, clock, TV, and radio cabinets, thermal insulation, ice buckets, containers, furniture construction, appliances, dinnerware, etc. The preparation and description of polystyrene and expandable polystyrene are well known in the art. They are discussed in G. Hawley, "Condensed Chemical Encyclopedia", 10th Edition, pp 838 and 976 (1981); Kirk-Othmer "Encyclopedia of Chemical Technology", 2nd Edition, Vol. 9, pp 847–884 (1966) and Vol. 19, pp 85–134 (1969); A. E. Platt in "Encyclopedia of Polymer Science and Technology", Vol. 13, pp 156–189 (1970); and U.S. Pat. Nos. 4,281,067; 4,298,702; 4,419,458; 4,497,911; 4,548,956; 4,596,682; and 4,618,468, the teachings of which are incorporated herein by reference.

For many applications where styrenic polymers are used, there is a need to add flame retardants since these materials are flammable. Some of the applications which require flame retarded styrenics are radio and TV cabinets, toys, electrical equipment, furniture construction, etc. (See, for example, U.S. Pat. Nos. 4,341,890 and 4,548,956, the teachings of which are incorporated herein by reference.)

The use of brominated and/or chlorinated compounds by themselves or in combination with other materials such as organic phosphates, antimony compounds etc. as flame retardants for polystyrene resin compositions are well known in the art and are exemplified by U.S. Pat. Nos. 4,218,511; 4,240,953; 4,244,825; 4,280,952; 4,281,067; 4,282,142; 4,341,890; 4,353,820; 4,377,407; 4,404,361; 4,419,458; 4,446,202; 4,497,911; 4,548,956; 4,596,682; and 4,618,468. The teachings of the aforesaid patents are incorporated herein by reference.

Tetrahalophthalate esters have been used as flameproofing materials. For example, U.S. Pat. No. 4,098,704 describes the use of these materials as textile finishing agents. U.S. Pat. Nos. 4,298,517 and 4,397,977 disclose these compounds as flame retardants for halogenated resins. However, no teachings have been found which show these compounds as flame retardants or processing aids for polystyrene resins.

SUMMARY OF THE INVENTION

The present invention is directed to a composition of a polystyrene resin and a flame retardant processing aid comprising
(i) a styrenic resin which is selected from one of the following:
(a) a homopolymer of styrene having the following repeatable unit

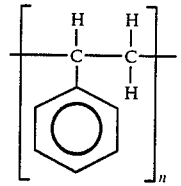

wherein n is within the range of greater than 1 to about 3,000;
(b) a homopolymer of styrene as in (a) modified with rubber in which the rubber is dispersed as discrete particles into a matrix of said homopolymer and the weight ratio of rubber to homopolymer is within the range of from about 2:98 to about 25:75; or
(c) a copolymer of butadiene and styrene in which the weight ratio of butadiene to styrene is within the range of about 2:98 to about 25:75; or
(d) blends of (a) and (b);
(ii) a flame retarding effective amount of a tetrahalophthalate ester flame retardant processing aid of the formula:

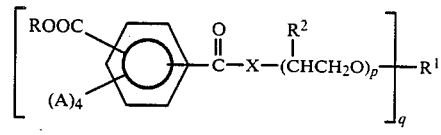

wherein:
(a) the ring can have all possible isomeric arrangements;
(b) R is selected from the group consisting of hydrogen, an alkyl or substituted alkyl of 1 to 30 carbons, hydroxyalkyl of 2 to 20 carbons, polyhydroxyalkyl of 3 to 10 carbons; and

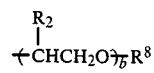

where $R^8$ is an alkyl or substituted alkyl of 1 to 18 carbons, and b is 1 to 50;
(c) $R^1$ is selected from the group consisting of hydrogen, an alkyl or substituted alkyl of 1 to 30 carbons, alkenyl or substituted alkenyl of 2 to 22 carbons,

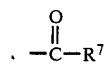

where $R^7$ is an alkyl of 1 to 18 carbons; a polyhydroxyalkyl of 3 to 12 carbons;

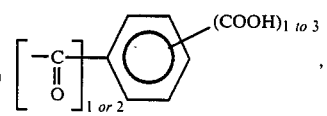

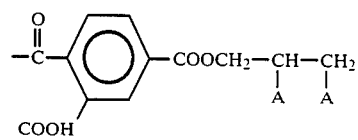

-continued

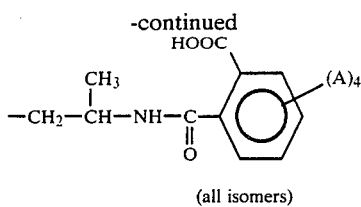

(all isomers)

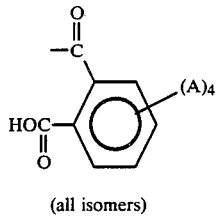

(all isomers)

$-\underset{|}{C}H\underset{|}{C}HNR^5R^6$, $-(\underset{|}{C}H\underset{|}{C}H)_2NR^5$, and $-(\underset{|}{C}H\underset{|}{C}H)_3N$;
with R³ R⁴ on each CHCH unit (d) R² is independently selected from the class consisting of H and CH₃—;
(e) R³, R⁴, R⁵, and R⁶ are independently selected from the class consisting of H and an alkyl of 1 to 18 carbons;
(f) p is an integer of 0 to 50;
(g) q is an integer of 1 to 6;
(h) X is selected from O or NH; and
(i) A is selected from Cl or Br.

Preferably, the weight ratio of (i) to (ii) is within the range of about 100:1 to about 2:1.

The preferred rubber of (i)(b) above is selected from the group consisting of polybutadiene and a styrene-butadiene copolymer.

The tetrahalophthalate ester of (ii) above is preferably one wherein R is an alkyl or substituted alkyl of 1 to 10 carbons, A is Br, X is oxygen, p is 0 to 20, and q is 1 to 6. More preferably, R is $-CH_2\underset{|}{C}H-OH$, $-CH_3$, $-C_2H_5$, $-C_3H_7$, $-C_4H_9$; $-C_6H_{13}$,
        CH₃

$-C_4H_9$ $-CH_6H_{13}$, $-C_8H_{17}$ $-CH_2\underset{|}{C}HC_4H_9$, $-C_{10}H_{21}$; R¹ is
                                    C₂H₅

CH₃, C₂H₅, C₄H₉, H, $-C_3H_7$, $-C_6H_{13}$, $-C_8H_{17}$, $-CH_2-\underset{|}{C}HC_4H_9$, $-C_{10}H_{21}$, or
        C₂H₅

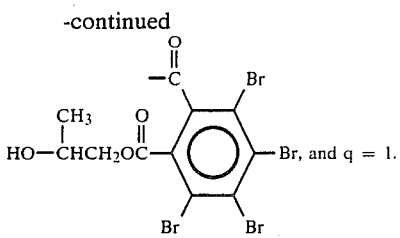

In a preferred embodiment of the invention, the homopolymer of (i)(a) above is in the form of a polystyrene foam. The foam is preferably prepared by polymerizing the repeatable homopolymer unit in the presence of a liquid or gaseous blowing agent and said agent has a boiling point that is below the softening point of the polystyrene and does not dissolve said polystyrene. The preferred blowing agents are selected from the group consisting of one or more of propane, butane, pentane, hexane, heptane, cyclohexane, methyl chloride, dichlorodifluoroethane, 1,1,2 trifluoroethane, and 1,1,2 trichloroethane.

The invention also comprehends the corresponding methods of manufacture of each of the above compositions.

Another aspect of this invention is that the composition may optionally also contain other bromine and/or chlorine compounds such as those that are well known in the art.

This invention also comprehends the method of improving the flame retardancy, processability and physical properties such as impact strength of the polystyrene resins by incorporating in the resin the tetrahalophthalate compound as described above, alone or in combination with other bromine and/or chlorine flame retardants. High impact polystyrene is sold on the basis of its impact properties. Unfortunately, when this material has to be flame retardant to meet code requirements, there has heretofore been a significant loss of impact strength with conventional retardants.

In practicing this invention, the tetrahalophthalate by itself or additionally with other brominated and/or chlorinated flame retardants is added to the polystyrene resin in any convenient manner, such as blending or extruding in order to provide a uniform composition. Flame retardant synergists such as antimony oxide (Sb₂O₃) may also be added if desired. In addition, other additives such as thermal stabilizers, ultraviolet stabilizers, reinforcing agents, organic polymers, mold release agents, blowing agents, colorants, and the like may also be optionally included. A further advantage of the polyoxyalkylene tetrahalophthalates alone or in combination with other brominated and/or chlorinated compounds as used in this invention is their improved compatibility with styrene resins.

Representative tetrahalophthalate compounds useful in practicing this invention are as follows (where A is Br or Cl):

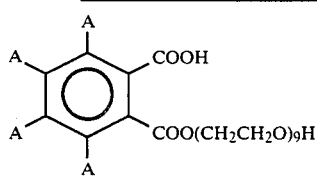

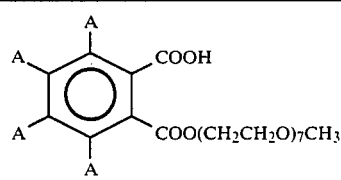

-continued
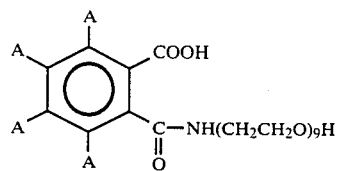
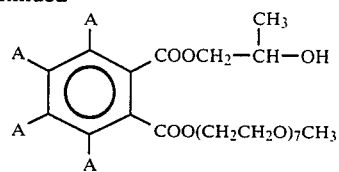
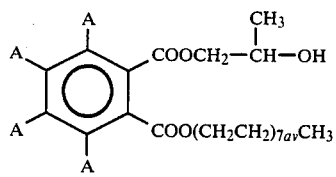
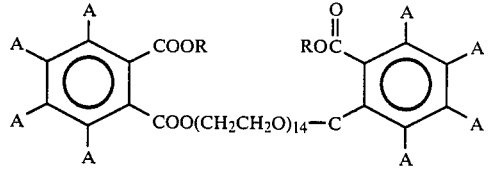
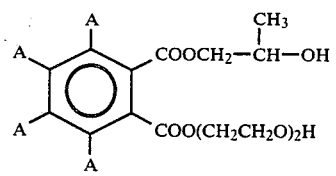
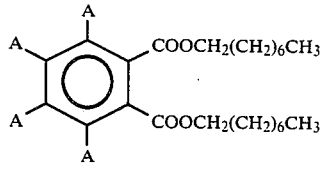
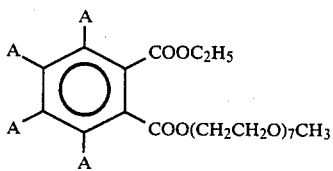
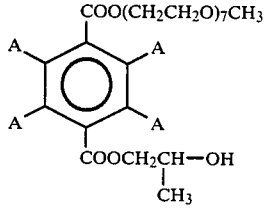
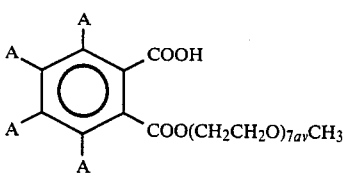
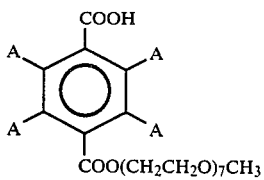
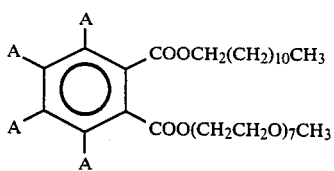
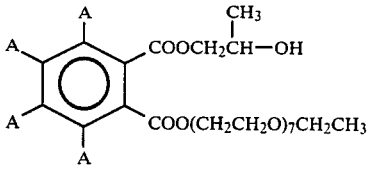
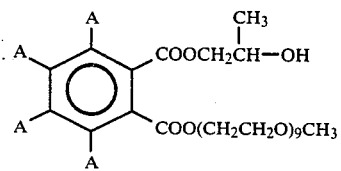
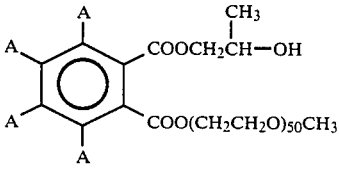
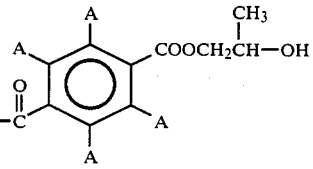
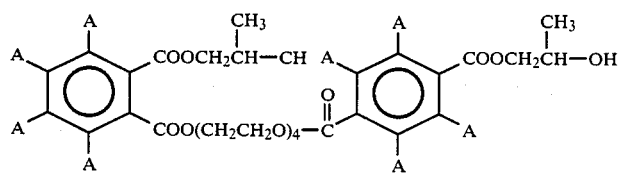
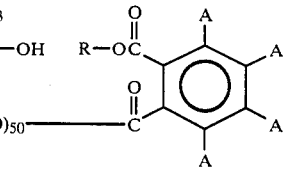
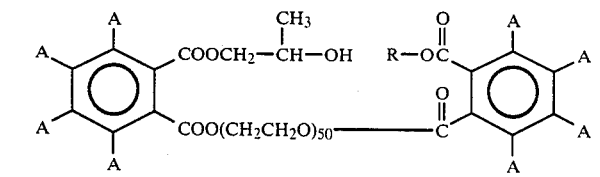

-continued
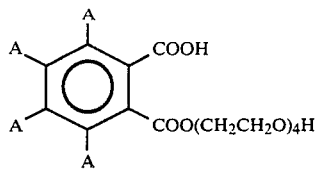 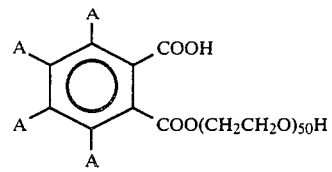
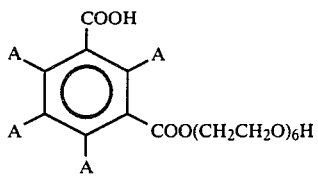 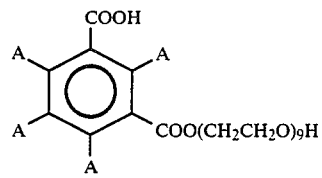
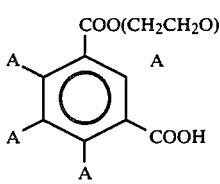 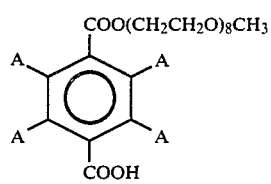
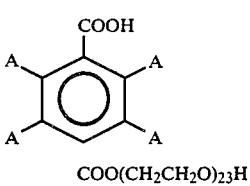 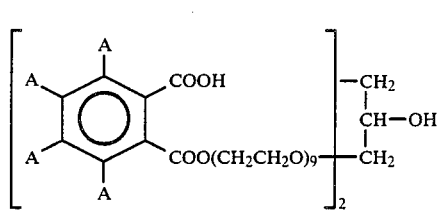
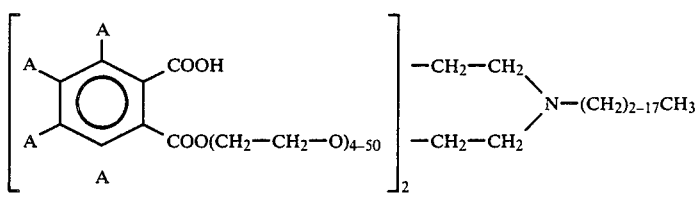
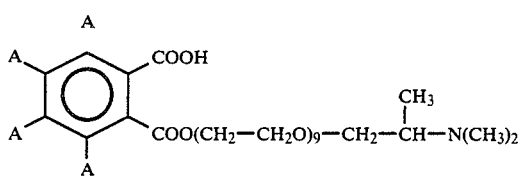 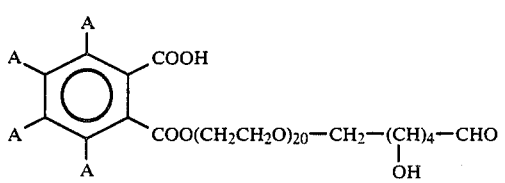
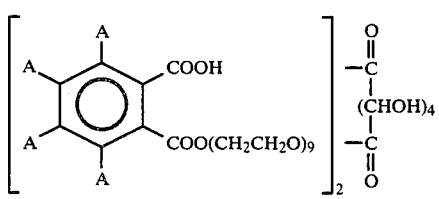 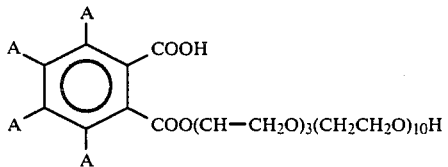
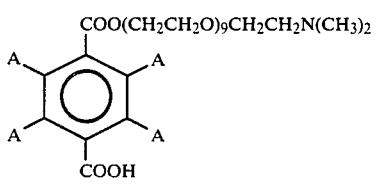 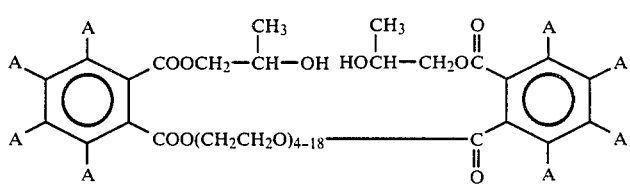

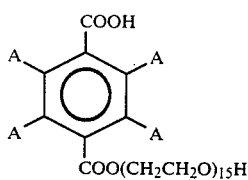
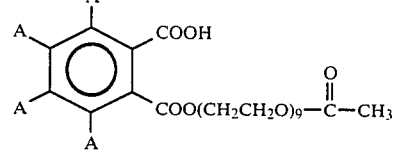
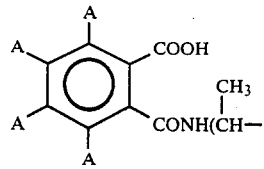
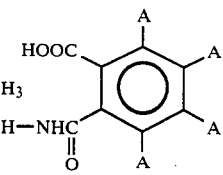
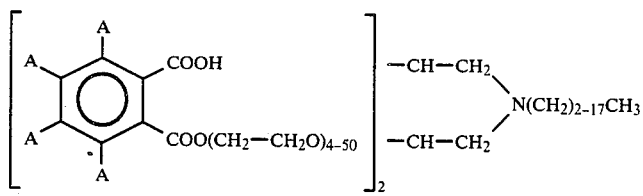
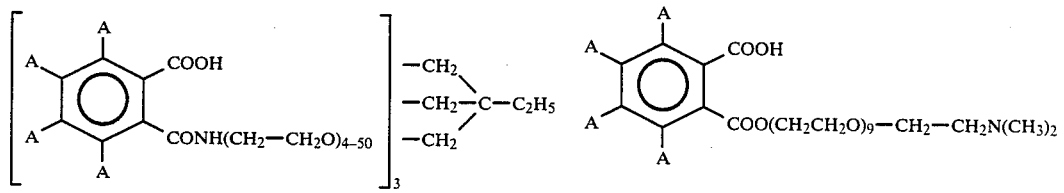
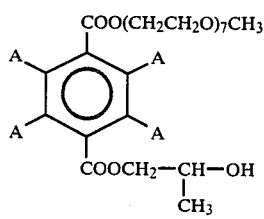
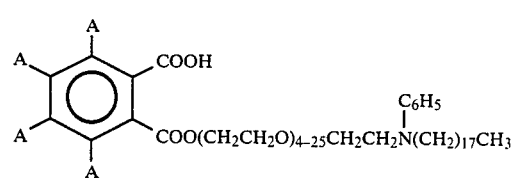
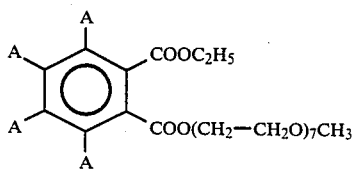
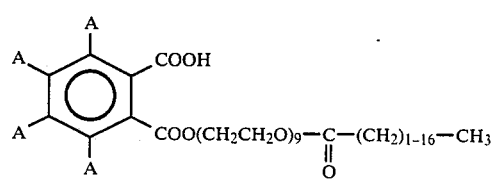
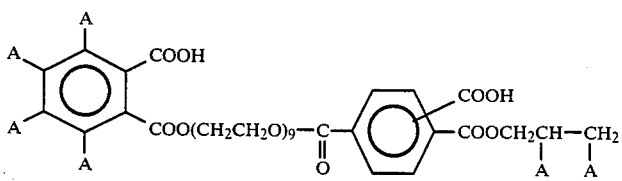
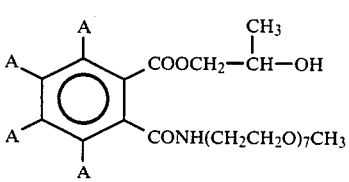
The preferred compounds are:
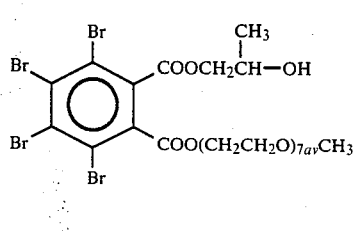
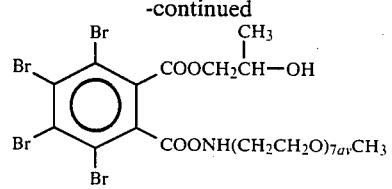

-continued
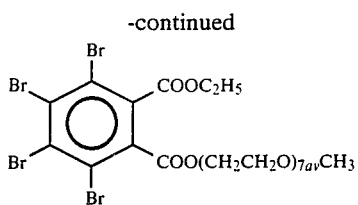
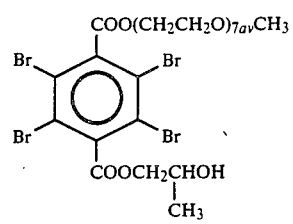
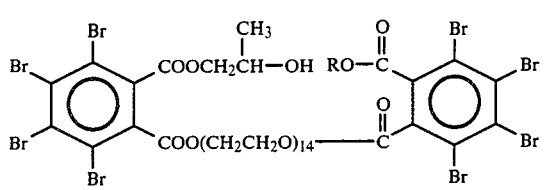
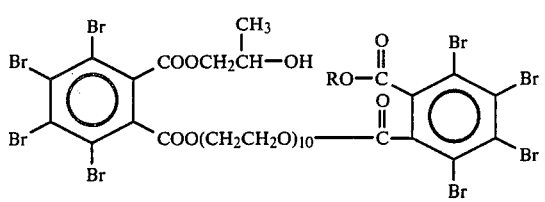
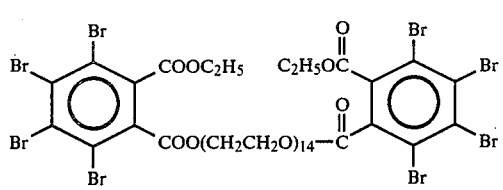
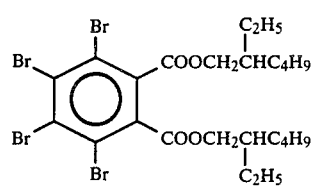
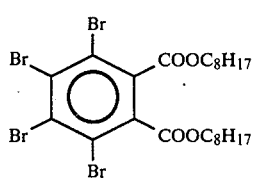
The R in the above formulas is
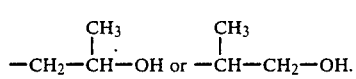
The brominated and/or chlorinated compounds that may be used in combination with the tetrahalophthalates are any of those that are well known in the art. Preferred halogenated flame retardant examples are
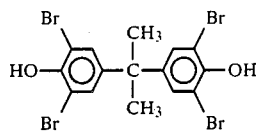
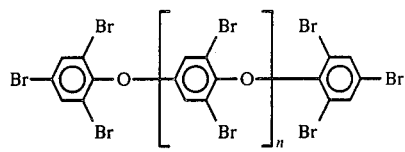
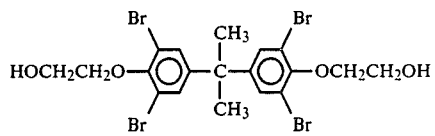
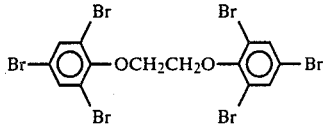
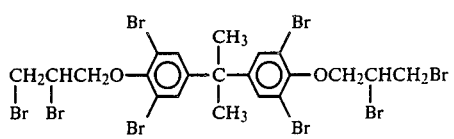
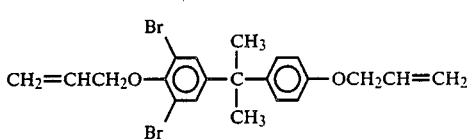
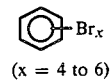
(x = 4 to 6)
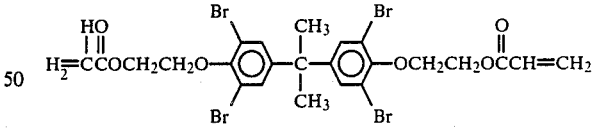
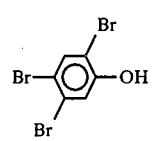
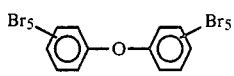
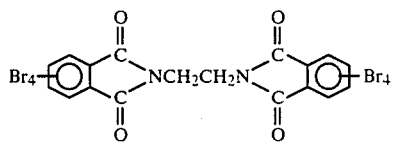

-continued

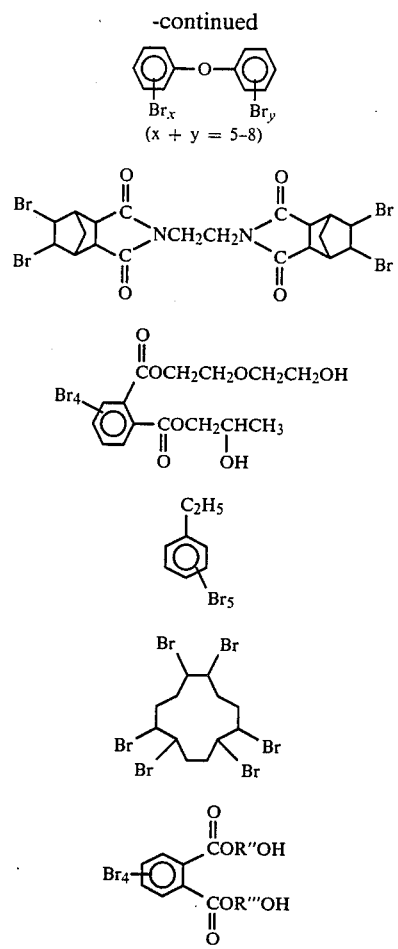

where R" and R''' are alkylene or substituted alkylene

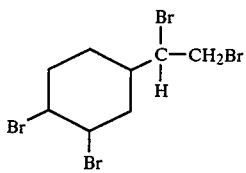

The styrenic resins that may be used in the present invention are the following: polystyrene homopolymer, both crystalline and non-crystalline forms; expandable polystyrene beads, and rubber-modified polystyrene which include medium impact polystyrene, high impact polystyrene (HIPS), and super high impact polystyrene.

The homopolymers of styrene, both crystalline and non-crystalline, have the following repeatable unit

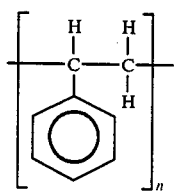

wherein n is greater than 1 to about 2000–3000. The non-crystalline forms are generally prepared by polymerizing styrene with peroxide catalyst such as those described in U.S. Pat. No. 4,281,067 while the crystalline stereoregular isotactic form uses Ziegler-Natta catalysts [See I. Pasquon in Encyclopedia of Polymer Science and Technology, Vol. 13 pp 14, 19–20, and 31 (1970)]

Expandable polystyrene beads are those that are prepared by incorporating a volatile expanding or blowing agent during the polymerization of styrene. The blowing or expanding agents that may be used to cause polystyrene to foam are well known in the art. They may be liquid or gaseous, do not dissolve the styrene polymer, and have boiling points below the softening point of the polymer (See Column 6 in U.S. Pat. No. 4,618,468). Suitable blowing agents are aliphatic hydrocarbons such as propane, butane, pentane, hexane, heptane, cyclohexane or halogen hydrocarbons such as methyl chloride, dichlorodifluoromethane, 1,1,2 trifluoroethane, 1,1,2 trichloroethane and the like. Mixtures of the above may also be used. Typically, expanding agents are are used in amounts of about 2 to 20% by weight.

Rubber-modified polystyrenes that are suitable include medium, high, and super high impact polystyrenes. In these compositions, the rubber is dispersed in the polystyrene matrix as discrete particles (See U.S. Pat. No. 4,341,890). Many rubber-modified styrenes are prepared by polymerizing styrene in the presence of a rubber such as polybutadiene or a styrene-butadiene copolymer (SBR). Some grafting of the styrene to the rubber takes place during polymerization. The weight ratio of the rubber to polystyrene may vary from about 2:98 to about 25:75. In general the moderate impact polystyrene will contain about 2 to about 4% rubber, the high impact polystyrene (HIPS) about 5 to about 10% rubber; and the super high impact polystyrenes greater than about 10% to about 25% [See H. Keskkula in "Encyclopedia of Polymer Science and Technology" Vol. 13, pp 396 and 400–404 (1970)].

The ratio of tetrahalophthalate or a mixture of tetrahalophthalate and one or more brominated and/or chlorinated compounds to styrenic resins that will impart flame retardancy to the latter may vary from 1:100 to about 1:2 depending on the application. In addition, the ratio of tetrahalophthalate to other brominated and/or chlorinated compounds may vary from 100:0 to about 1:99.

The compositions of this invention may also include other additives such as thermal stabilizers, ultraviolet stabilizers, reinforcing agents, organic polymers, mold release agents, blowing agents, colorants, etc.

In order to illustrate the present invention, the following examples are presented. These are not to be construed as limiting the scope of the invention.

EXAMPLE 1

To 1,392 g (3.0 moles) of tetrabromophthalic anhydride were added 1,050 g (3.0 moles) of Methoxy Carbowax 350 in the presence of 22.0 g of sodium acetate. The mixture was heated at 90° C. for 8 hours in a nitrogen atmosphere. The reaction mixture was filtered hot to remove the sodium acetate. The analytical data were consistent with the assigned structure.

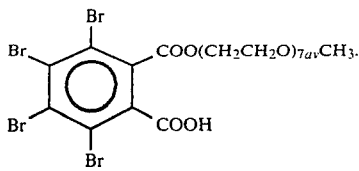

EXAMPLE 2

To the compound of Example 1 were added 348.0 g (6.0 moles) of propylene oxide and 2.0 liters of toluene. The mixture was heated at 60°–100° C. The solvent and residual propylene oxide were removed to give the product in almost quantitative yield. The analytical data were consistent with the assigned structure:

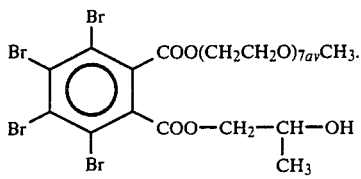

EXAMPLE 3

To 92.8 g (0.2 mole) of tetrabromophthalic anhydride is added all at once 80 g (0.2 mole) of Carbowax 400 and the mixture heated to 120°–130° C. for 2.5 hours. The desired product is isolated in essentially quantitative yield as a clear yellow viscous liquid. Calcd. Mol. Wt., 864; found 865. Calcd. % Br, 37.1; found, 38.5. The analytical data are consistent with the assigned structure:

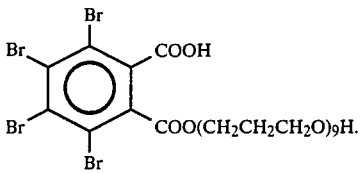

EXAMPLE 4

To 240 g (0.24 mole) of the compound of Example 3 is added 45.3 g (0.24 mole) of trimellitic anhydride and heated at 155° C. under nitrogen for abut 7 hours. The infrared spectrum indicated the completion of the reaction by the substantial disappearance of the anhydride absorption band at 5.65. The product was isolated in essentially quantitative yield. Analy. Calcd.; %Br, 30.3%; Mol. Wt., 1056; neutralization equivalent, 352; Found: %Br, 29.4; Mol. Wt., 1014; neutralization equivalent, 351. The spectral data was consistent with the structure:

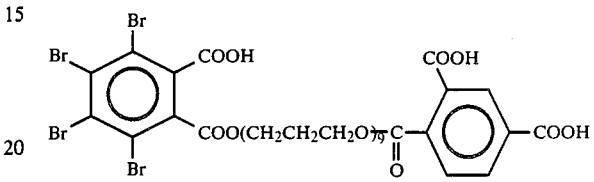

EXAMPLE 5

To 156.3 g(0.18 mole) of the compound of Example 3 is added 70.9 g(0.18 mole)2,3-dibromopropyl trimellitate. The mixture is heated at 130°–140° C. for 6 hours with stirring to give the product as a brown opaque oil. Isolation afforded the product in essentially quantitative yield and the analysis is consistent with the structure being:

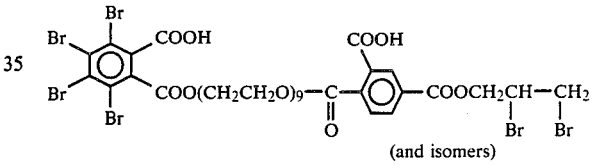

EXAMPLES 6 TO 11

The following preparation were carried out as in Example 1 using the reactant set forth below.

| Example No. | Tetrabromophthalic Anhydride | Hydroxy Compound | Product Structure |
| --- | --- | --- | --- |
| 6 | 1.0 mole | HOCH$_2$CH$_2$OCH$_2$CH$_2$OH 1.0 mole | Br$_4$C$_6$(COOH)(COO(CH$_2$CH$_2$O)$_2$H) |
| 7 | 1.0 mole | HO(CH$_2$CH$_2$O)$_4$H (Carbowax 200) 1.0 mole | Br$_4$C$_6$(COOH)(COO(CH$_2$CH$_2$O)$_4$H) |

-continued

| Example No. | Tetrabromophthalic Anhydride | Hydroxy Compound | Product Structure |
|---|---|---|---|
| 8 | 1.0 mole | HO(CH$_2$CH$_2$O)$_{13}$H (Carbowax 600) 1.0 mole | (structure with Br$_3$, COOH, COO(CH$_2$CH$_2$O)$_{13}$H) |
| 9 | 1.0 mole | HO(CH$_2$CH$_2$O)$_{23}$H (Carbowax 1000) 1.0 mole | (structure with Br$_4$, COOH, COO(CH$_2$CH$_2$O)$_{23}$H) |

The following preparation were carried out as in Example 1 using the reactant set forth below.

| Example No. | Tetrabromophthalic Anhydride | Hydroxy Compound | Product Structure |
|---|---|---|---|
| 10 | 1.0 mole | HO(CH$_2$CH$_2$O)$_{45}$H (Polyglycol E-2000) 1.0 mole | (structure with Br$_4$, COOH, COO(CH$_2$CH$_2$O)$_{45}$H) |
| 11 | 2.0 mole | HO(CH$_2$CH$_2$O)$_9$H (Carbowax 400) 1.0 mole | (bis tetrabromophthalate structure with COO(CH$_2$CH$_2$O)$_9$C(=O) linker) |

EXAMPLE 12

To 96.4 g(0.2 mole) of tetrabromoterephthalic acid is added all a once 160 g(0.2 mole) of Carbowax 400 and 300 g toluene containing 1.0 g F-toluene sulfonic acid. The mixture is heated to reflux until 3.6 g(0.2 mole) water was collected. The toluene is removed under reduced pressure to give a clear viscous liquid in essentially quantitative yield.

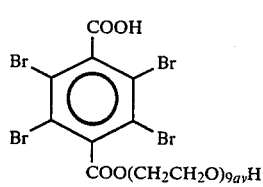

EXAMPLE 13

To 86.4 g(0.1 mole) of the compound of Example 3 is added all at once 21.8 g(0.1 mole) pyromellitic dianhydride and the mixture heated to 120°–130° C. for 2.5 hours to give the desired product. Water, 1.8 g(0.1 mole), is added to open the remaining anhydride group and the analytical data are consistent with the assigned structure:

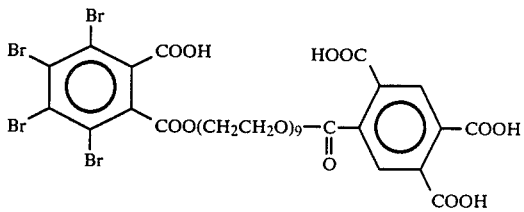

EXAMPLE 14

To 86.4 g(0.1 mole) of the compound of Example 3 is added all at once 10.9 g(00.05 mole) of pyromellitic dianhydride and the mixture heated to 120°–130° C. for 2.5 hours to give the desired product. The analytical data are consistent with the assigned structure:

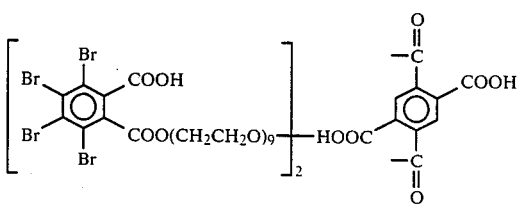

(and isomers)

EXAMPLE 15

To 86.4 g(0.1 mole) of the compound of Example 3 is added all at once 21.8 g(0.1 mole) of phthalic anhydride and the mixture heated to 120°-130° C. for 2.5 hours to give the desired product. The analytical data are consistent with the assigned structure:

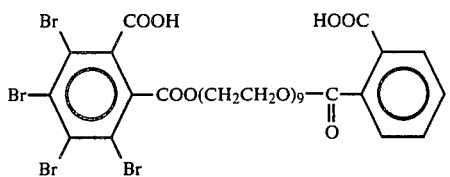

EXAMPLE 16

To 139.2 g(0.3 mole) of tetrabromophthalic anhydride is added all at once 122.9 g(0.1 mole) polyoxyethylated trimethylol propane of molecular weight 1229 and the mixture heated to 120°-130° C. for 2.5 hours to give the desired product. The analytical data are consistent with the assigned structure:

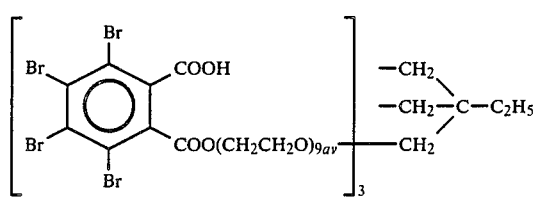

EXAMPLE 17

To 139.2 g(0.3 mole) of tetrabromophthalic anhydride is added all at once 156.8 g (0.1 mole) polyoxypropylated trimethylol propane of molecular weight 1568 and the mixture heated to 120°-130° C. for 2.5 hours to give the desired product. The analytical data are consistent with the assigned structure:

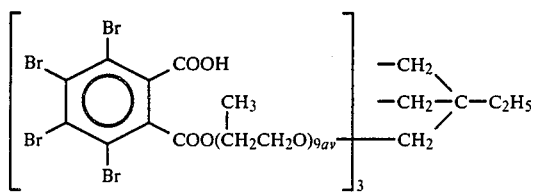

EXAMPLE 18

To 284.0 g(1.0 mole) of tetrachlorophthalic anhydride is added 350.0 g(1.0 mole) of Methoxy Carbowax 350 in presence of 7.0 g of sodium acetate. The mixture is heated at 90° C. for 8 hours in a nitrogen atmosphere. The reaction mixture is filtered hot to remove sodium acetate to give the expected product in nearly quantitative yield. The analytical data are consistent with the assigned structure:

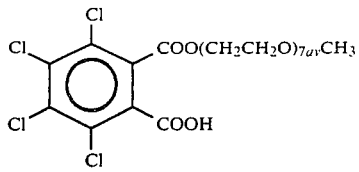

EXAMPLE 19

To 634.0 g(1.0 mole) of the composition of Example 18 is added 116 g(2.0 moles) of propylene oxide in 200 ml of toluene. The reaction mixture is heated from 60°-100° C. for 3-5 hours, and then concentrated to give the product in nearly quantitative yield. The analytical data are consistent with the assigned structure:

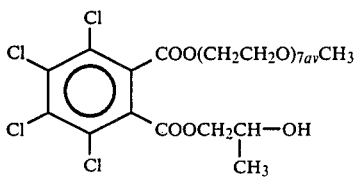

EXAMPLE 20

To 284.0 g(1.0 mole) of tetrachlorophthalic anhydride is added 200.0 g(1.0 mole) of Carbowax 200 in the presence of 7.0 g of sodium acetate. The mixture is heated at 90° C. for 8 hours in a nitrogen atmosphere. The reaction mixture is filtered hot to remove sodium acetate to generate the expected product in nearly quantitative yield. The analytical data are consistent with the assigned structure:

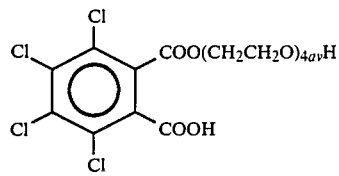

EXAMPLE 21

To 484.0 g(1.0 mole) of the product of Example 21 is added 116.0 g(2.0 mole) of propylene oxide in 200 ml of toluene. The reaction mixture is warmed at 60°-100° C. for 3-5 hours, and then concentrated to give the product in nearly quantitative yield. The analytical data are consistent with the assigned structure:

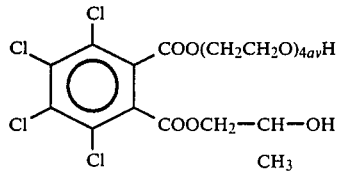

EXAMPLE 22

To 284.0 g(1.0 mole) of tetrachlorophthalic anhydride is added 400.0 g(1.0 mole) of Carbowax 400 in the presence of 7.0 g of sodium acetate. The mixture is heated at 90° C. for 8 hours in a nitrogen atmosphere.

The reaction mixture is filtered hot to remove sodium acetate to generate the expected product in nearly quantitative yield The analytical data are consistent with the assigned structure:

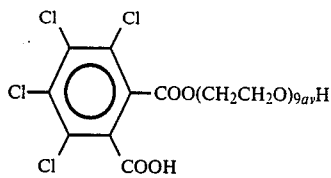

EXAMPLE 23

To 46.4 g(0.1 mole) of tetrabromophthalic anhydride is added all at once 44.1 g(0.1 mole) of polyoxyethylated dimethylamine [CH$_3$)$_2$N(CH$_2$CH$_2$O)$_9$H] dissolved in 100 ml of toluene. The mixture was heated at 100°–110° C. for 4–5 hours and then concentrated to give the desired product in essentially quantitative yield. The analytical data are consistent with the assigned structure:

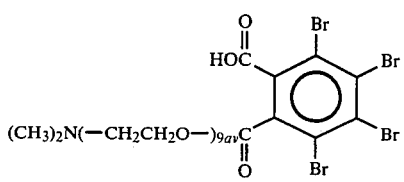

EXAMPLE 24

To 92.8 g(0.2 mole) of tetrabromophthalic anhydride is added 80.0 g(0.2 mole) of

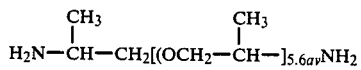

(Jeffamine D-400) and the mixture heated to about 120° C. The final product is obtained in almost quantitative yield. The analytical data are consistent with the assigned structure:

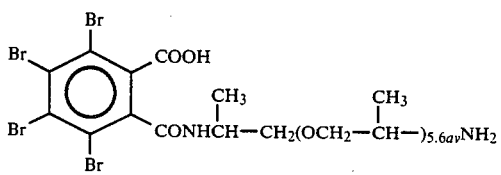

EXAMPLE 25

Poly(ethylene glycol 300), 204.5 g (0.67 mole) was refluxed (T=117° C.) with 600 ml of toluene for 1.5 hous in order to remove a small amount of water present in the glycol. The mixture was cooled to about 100° C. and tetrabromophthalic anhydride, 614.5 g (1.35 moles) and sodium acetate, 1.62 g were added and the mixture was reheated to reflux and held for 25 hours. After the mixture was cooled to 50° C., propylene oxide, (156.4 g, 2.69 moles, 100% excess) was added and the mixture heated to and held at 100° C. for 2.5 hours. When the solution cooled to about 50° C. it was filtered through a bed or diatomaceus earth and decolorizing charcoal. The filtrate was distilled to remove the solvent to give 904.1 g of product as a viscous liquid. Calcd. % Br, 47.4. Found % Br, 46.5. Analytical data is consistent with the assigned structure.

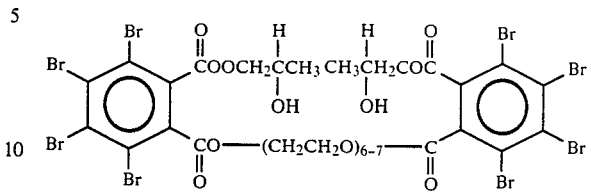

EXAMPLE 26

This compound was prepared by the procedure described in Example 25 except that poly(ethylene glycol 200) was used in place of poly(ethylene 300). Product is viscous liquid. Calcd. % Br, 51.0. Found % Br, 49.3. Analytical data was consistent with the assigned structure.

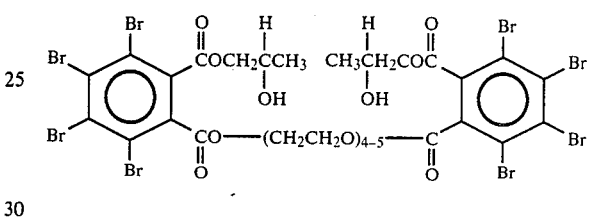

EXAMPLE 27

This compound was prepared by the procedure described in Example 25 except that poly(ethylene glycol 600) was used in place of poly(ethylene glycol 300). Product is a viscous liquid. Calcd. % Br, 39.5. Found % Br, 39.3. Analytical data is consistent with the assigned structure.

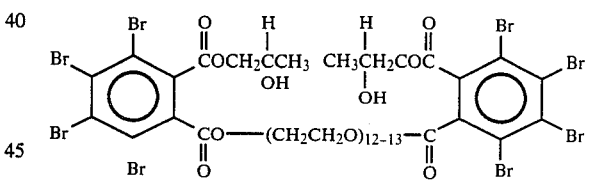

EXAMPLE 28

This compound was prepared by the procedure described in Example 25 except that poly(ethylene glycol 400) was used in place of poly(ethylene glycol 300). Product is a viscous liquid. Calcd. % Br, 44.2. Found % Br, 44.0. Analytical data is consistent with the assigned structure.

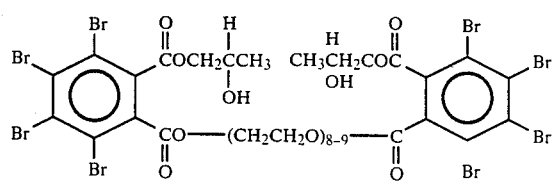

EXAMPLE 29

Methanol (54.1 g, 1.5 mole), tetrabromophthalic anhydride (695.6 g, 1.6 moles), and potassium acetate, 2.73 g were refluxed for 4 hours with 500 ml of toluene. After cooling the reaction mixture to room temperature, propylene oxide (87.12 g, 1.5 moles) were added and the mixture reacted at 80° C. for 2.5 hours. Product was obtained as a viscous liquid after distilling out the toluene. Calcd. % Br, 57.7. Found % Br, 57.2. Analytical data is consistent with assigned structure.

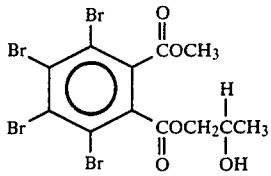

EXAMPLE 30

This compound was prepared by the procedure similar to that described in Example 29 except that methoxycarbowax 350 was used in place of methanol and ethylene oxide in place of propylene oxide. Calcd. % Br, 37.8. Found % Br, 37.2. Analytical data is consistent with assigned structure.

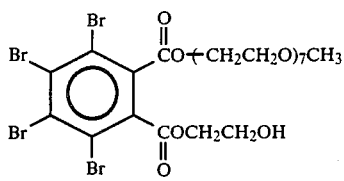

EXAMPLE 31

This compound was prepared by the procedure in Example 29 except that 2-methoxyethanol is used in place of methanol. Product is viscous liquid. Calcd. % Br, 53.6. Found % Br, 52.0. Analytical data is consistent with the assigned structure.

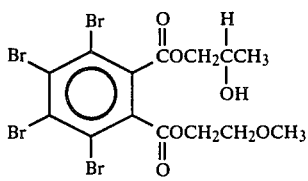

EXAMPLE 32

This compound was prepared by the procedure outlined in Example 29 except that methoxycarbowax 350 was used in place of methanol and epoxybutane in place of propylene oxide. Product is a viscous liquid. Calcd. % Br, 36.5. Found % Br, 37.2. Analytical data is consistent with the assigned structure.

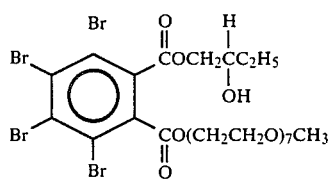

EXAMPLE 33

This compound was prepared by the procedure outlined in Example 29 except that 2-ethylhexanol-1 was used in place of methanol. Product is a viscous liquid. Calcd. % Br, 50.0. Found % 52.7. Analytical data is consistent with the assigned structure.

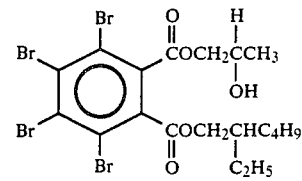

EXAMPLE 34

This compound was prepared by the procedure described in Example 29 except that stearyl alcohol was used in place of methanol. Product is a viscous liquid. Calcd. % Br, 41.0. Found % Br, 43.0. Analytical data is consistent with the assigned structure.

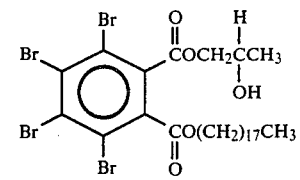

EXAMPLE 35

This compound was prepared by the procedure described in Example 29 except that 2,3-dibromopropanol-1 was used in place of methanol. Product is a viscous liquid. Calcd. % Br, 64.8. Found % Br, 61.9. Analytical data is consistent with the assigned structure.

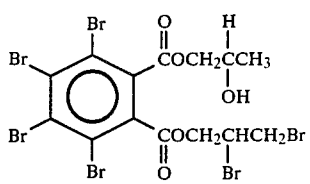

EXAMPLE 36

This compound was prepared by the procedure outlined in Example 29 except that epichlorohydrin was used in place of propylene oxide. Calcd. % Br, 35.7. Found % 35.4. Analytical data is consistent with the assigned structure.

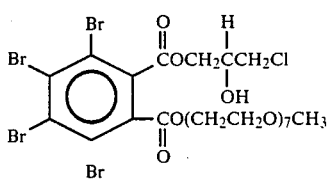

EXAMPLE 37

To a solution of methoxycarbowax 350 (300.0 g, 0.89 mole) in dry toluene (184 ml) was added sodium methoxide (48.0 g, 0.90 mole) in methanol. The methanol was then distilled off atmospherically. Tetrabromophthalic anhydride was then added (442.2 g, 0.89 mole) along with an additional 50 ml of toluene. The reaction mixture was refluxed for 2 hours and after cooling to room temperature, epichlorohydrin (106.94 g, 1.16 moles) was added. The mixture was refluxed for 20 hours. After the solvent and excess epichlorohydrin were distilled, a viscous dark product was obtained. Calcd. % Br, 37.2. Found % Br, 40.4. Analytical data is consistent with assigned structure.

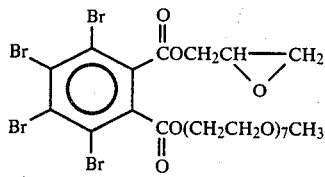

EXAMPLE 38

Methoxycarbowax 350 and toluene were refluxed for 1 hour in order to distill out a small amount of water. Tetrabromophthalic anhydride (1:1 mole ratio with methoxycarbowax 350) and sodium acetate were added and the mixture refluxed for 17 hours. After cooling to room temperature, an excess of diazomethane (prepared from the decomposition of N-methyl-N-nitroso-p-toluene sulfonamide by sodium hydroxide) in ethyl ether was added and the mixture allowed to stand overnight. The excess diazomethane was decomposed by adding acetic acid and the solvent removed by distillation. Product is viscous liquid. Calcd. % Br, 39.2. Found % Br, 37.4. Analytical data is consistent with the assigned structure.

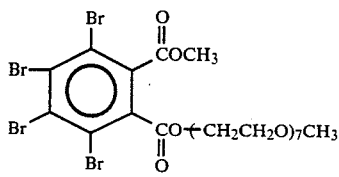

EXAMPLE 39

Di(2-ethylhexyl) tetrabromophthalate was prepared by the procedure described by Spatz et. al (I & EC Product Research and Development, Vol. 8, No. 4, 395 (1969).

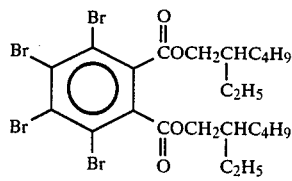

EXAMPLE 40

Poly(ethylene glycol) 600) 885.4 g (1.40 moles), tetrabromophthalic anhydride, 1298.4 g (2.80 moles), potassium acetate, 1.35 g, and toluene (1000 g) were charged into a one-gallon glass-lined reactor and heated to 120° C. After 4 hours at this temperature, ethylene oxide, 246.68 g (5.60 moles) was pumped into the reactor in ¾ hour while maintaining the temperature at 120° C. After one hour longer of heating, the mixture was cooled to room temperature, the excess ethylene oxide was then vented, and the product collected. After stripping off the toluene, 2250 g of the product was isolated in 99% yield as a viscous liquid. Calcd. % Br, 39.2. Found % Br, 38.8. Analytical data is consistent with the assigned structure.

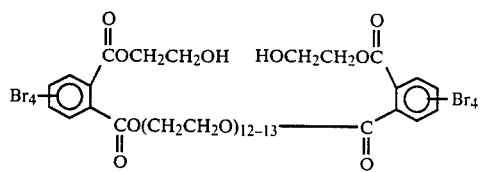

EXAMPLE 41

To the product of Example 3, 453.8 g (0.27 mole), acetic anhydride, 83.4 g (0.82 mole), potassium acetate, 1.0 g, and toluene, 400 ml, were refluxed for 8 hours. After cooling to room temperature, the reaction mixture was transferred to a separatory funnel and extracted first with 100 ml of a 16% potassium bicarbonate solution and then with 100 ml of water. After distilling off the solvent, 335.0 g (64% yield) of product was obtained as a viscous liquid. Calcd. % Br, 36.8. Found % Br, 32.9. Analytical data is consistent with the assigned structure.

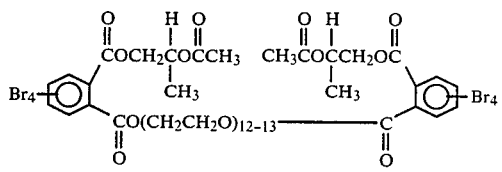

EXAMPLE 42

Tetrabromophthalic anhydride, 231.9 g (0.50 mole), 2-ethylhexanol, 130.2 g (1.0 mole), and potassium acetate, 0.24 g were heated to and kept at 120° C. for 4 hours. The mixture was cooled to 60° C. and potassium carbonate, 35.9 g (0.26 mole), was added. Reheated mixture to 80° C. and kept it at this temperature for 2 hours. Cooled mixture to 60° C. and added triethylamine, 14.2 g (0.14 mole). Reheated mixture to 70° C. and added methyl iodide, 113.6 g (0.8 mole) in 20 minutes. Heated mixture to 70°-75° C. and kept it at this temperature for 2½ hours. Cooled mixture to room temperature and filtered it in order to remove by-product potassium iodide. The filtrate was distilled to remove toluene and 290 g of crude product was collected as a pale yellow liquid. Extracted this product with 3 times 100 ml of a 6.5% potassium carbonate solution followed by 2 times 100 ml of water and once with a 30% sodium chloride solution. Dried the organic phase over anhydrous magnesium sulfate overnight. Filtered off magnesium sulfate and after removing the solvent from filtrate by distillation, 204 g of product was obtained in 67% yield as a pale yellow liquid. Calcd. % Br, 52.6. Found % Br, 52.2. Analytical data is consistent with the assigned structure.

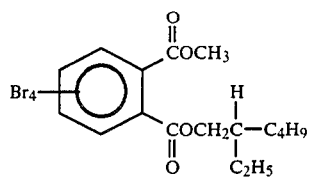

EXAMPLE 43

Tetrabromophthalic anhydride, 231.9 g (0.5 mole), 2-[2-methoxyethoxy]-ethanol, 360.5 g (3.0 moles), stannous oxalate, 2.32 g, and xylene, 200 ml, were refluxed (temp. 160° C.) for 18 hours during which time, theory water was collected. The xylene and excess 2-[2-methoxyethoxy]-ethanol were distilled under reduced pressure to give 332 g of crude product as a wet white solid. Redissolved 256 g of this material in toluene (1000 ml) and extracted it with 3 times 200 ml of a 7.5% potassium bicarbonate solution followed by one extraction with 200 ml of water. Dried the organic phase with anhydrous magnesiuM sulfate overnight. After removing the magnesium sulfate by filtratin, toluene was removed by distillation to give 45 g of a yellow liquid product. Overall yield is 17%. Calcd. % Br, 46.6. Found % Br, 45.7. Analytical data is consistent with the assigned structure.

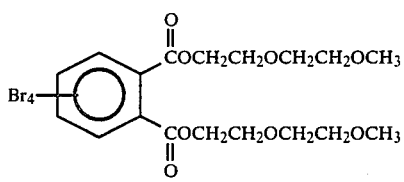

EXAMPLE 44

This compound was prepared by the procedure outlined in Example 43 except that 2-[2-methoxyethoxy]-ethanol.

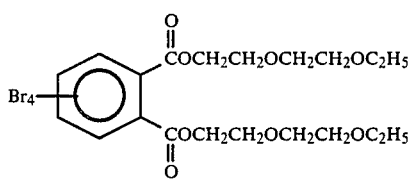

EXAMPLE 45

This compound was prepared by the procedure outlined in Example 1 except that docosyl alcohol (behenyl alcohol) was used in place of poly(ethylene glycol 600) and propylene oxide in place of ethylene oxide. Product is a viscous liquid. Calcd. % Br, 37.7. Found % Br, 36.5. Analytical data is consistent with the assigned structure.

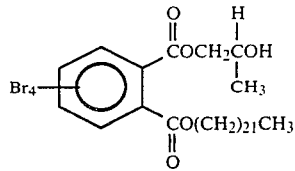

EXAMPLE 46

This compound was prepared by the procedure outlined in Example 1 except that tricontyl alcohol was used in place of poly(ethylene glycol 600) and propylene oxide in place of ethylene oxide. Product is a viscous liquid.

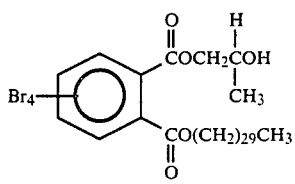

EXAMPLE 47

This compound was prepared by the procedure outlined in Example 4 except that methoxycarbowax 550 was used in place of 2-[2-methoxyethoxy]-ethanol.

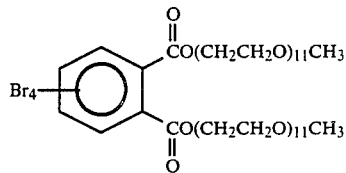

EXAMPLES 48-53

In the following examples, the flame retardancy of the compositions of this invention are demonstrated. The compositions were prepaed by mixing together the flame retardants, antimony oxide, and high impact polystyrene on a roller until the compounds were blended thoroughly. The compounds were pelletized at 200°-260° C. and then injection molded into test specimens at 230° C. The UL-94 vertical burn test was run and compared to a control consisting of the impact polystyrene itself.

HIPS=High Impact Polystyrene
DBDPO=Decabromodiphenyl Oxide (83% Bromine)
DOTBP=Dioctyl Tetrabromophthalate (45% Bromine)
AO=Antimony Oxide

TABLE 1

| | Example No. | | | | | |
| --- | --- | --- | --- | --- | --- | --- |
| | 48 | 49 | 50 | 51 | 52 | 53 |
| | Percentage Composition | | | | | |
| HIPS[a] | 100 | 84 | 81.5 | 73.9 | 83 | 80.8 |
| DBDPO | — | 12 | 9 | — | 9 | — |
| DOTBP | — | — | 5.5 | 22.1 | 4.3 | 16.4 |
| AO | — | 4 | 4 | 4 | 3.7 | 2.8 |
| UL-94 @ 0.125" | Failed | V-0 | V-0 | V-0 | V-0 | V-0 |
| @ 0.062 | Failed | V-2 | V-0 | V-0 | V-0 | V-2 |

[a]Polysar ® 525 from Polysar, Inc.

The above results clearly demonstrate the superior flame retardancy of the composition of this invention over the conventional flame retardant used in polystyrene (DBDPO).

Examples 49 through 51 are all run at equal bromine levels. Partial or total replacement of the conventional flame retardant (DBDPO) with a composition of this invention improves the flame retardancy of the polystyrene as can be seen by the UL-94 results for the 0.062" specimens. Examples 52 and 53 clearly demonstrate that the total bromine levels can be reduced when the compositions of this invention are used and still yield comparable or better flame retardancy.

EXAMPLES 54–59

Impact strength of the various materials were determined according to ASTM D2463.

TABLE II

| Example No. | 54 | 55 | 56 | 57 | 58 | 59 |
|---|---|---|---|---|---|---|
| HIPS[a] | 100 | 84 | 81.5 | 76.4 | 73.9 | 80.8 |
| DBDPO | — | 12 | 9 | 3 | — | — |
| DOTBP | — | — | 5.5 | 16.6 | 22.1 | 16.4 |
| AO | — | 4 | 4 | 4 | 4 | 2.8 |
| Gardner Impact (in-lb/mil) | 0.096 | 0.067 | 0.070 | 0.084 | 0.115 | 0.095 |

[a]Polysar ® 525 from Polysar, Inc.

As can be seen from the data above, the conventional flame retardant, DBDPO, greatly reduces the impact strength of the polystyrene. The compositions containing the material of the invention clearly improve the impact strength to a point where it is better than the control (Example 54).

EXAMPLES 60–63

The extrusion rates were measured during pelletization to determine the processing charateristics of the compounds.

TABLE III

| Example No. | 60 | 61 | 62 | 63 |
|---|---|---|---|---|
| HIPS[a] | 84 | 81.5 | 79 | 76.4 |
| DBDPO | 12 | 9 | 6 | 3 |
| DOTBP | — | 5.5 | 11 | 16.6 |
| AO | 4 | 4 | 4 | 4 |
| Extruder Flow Rate (lbs/hr) | 3.4 | 3.7 | 4.2 | 7.9 |

[a]Polysar ® 525 from Polysar, Inc.

The data above clearly demonstrates the improved processability of the compositions containing the materials of this invention.

We claim:

1. A flame retardant composition comprising
(i) a styrenic resin which is
 a homopolymer of styrene having the following repeatable unit $$\left[\begin{array}{cc} H & H \\ -C-C- \\ | & | \\ Ph & H \end{array}\right]_n$$

wherein n is within the range of greater than 1 to about 3,000;

(ii) a flame retarding effective amount of a tetrahalophthalate ester flame retardant processing aid of the formula:

$$\left[\begin{array}{c} ROOC \\ \phantom{ROOC} \\ (A)_4 \end{array}\!\!\!\!\bigcirc\!\!\!-\!\!\overset{O}{\underset{\|}{C}}\!\!-\!X\!-\!(\overset{R^2}{\underset{|}{CH}}CH_2O)_p\right]_q\!\!-\!R^1$$

wherein:
(a) the ring can have all possible isomeric arrangements;
(b) R is selected from the group consisting of hydrogen, an alkyl or substituted alkyl of 1 to 30 carbons, hydroxyalkyl of 2 to 20 carbons, polyhydroxyalkyl of 3 to 10 carbons; and $$-(-\overset{R_2}{\underset{|}{CH}}CH_2O\!\!-\!\!)_b R^8$$

where $R^8$ is an alkyl or substituted alkyl of 1 to 18 carbons, and b is 1 to 50;

(c) $R^1$ is selected from the group consisting of hydrogen, an alkyl or substituted alkyl of 1 to 30 carbons, alkenyl or substituted alkenyl of 2 to 22 carbons, $$-\overset{O}{\underset{\|}{C}}-R^7,$$

where $R^7$ is an alkyl of 1 to 18 carbons; a polyhydroxyalkyl of 3 to 12 carbons;

$$\left\{-\overset{}{\underset{\|}{C}}\!\!=\!\!O\right\}_{1\ or\ 2}\!\!-\!\!\bigcirc\!\!-\!(COOH)_{1\ to\ 3},$$

$$-\overset{O}{\underset{\|}{C}}-\!\!\bigcirc\!\!-\!\!COOCH_2\!\!-\!\!\overset{}{\underset{A}{CH}}\!\!-\!\!\overset{}{\underset{A}{CH_2}},$$
COOH $$-CH_2\!\!-\!\!\overset{CH_3}{\underset{|}{CH}}\!\!-\!\!NH\!\!-\!\!\overset{HOOC}{\underset{\|}{\underset{O}{C}}}\!\!-\!\!\bigcirc\!\!-\!(A)_4 \quad \text{(all isomers),}$$

$$-\overset{O}{\underset{\|}{C}}\!\!-\!\!\overset{HOC}{\underset{\|}{\underset{O}{}}}\!\!\bigcirc\!\!-\!(A)_4 \quad \text{(all isomers),}$$

$$-\overset{R^3}{\underset{|}{CH}}\overset{R^4}{\underset{|}{CH}}NR^5R^6,\ -(\overset{R^3}{\underset{|}{CH}}\overset{R^4}{\underset{|}{CH}})_2NR^5,\ \text{and}\ -(\overset{R^3}{\underset{|}{CH}}\overset{R^4}{\underset{|}{CH}})_3N;$$

(d) $R^2$ is independently selected from the class consisting of H and $CH_3$—;

(e) $R^3$, $R^4$, $R^5$, and $R^6$ are independently selected from the class consisting of H and an alkyl of 1 to 18 carbons;
(f) p is an integer of 0 to 50;
(g) q is an integer of 1 to 6;
(h) X is selected from O or NH; and
(i) A foamable is selected from Cl or Br; and
(iii) a liquid or gaseous blowing agent.

2. The composition of claim 1 wherein the weight ratio of (i) to (ii) is within the range of about 100:1 to about 2:1.

3. The composition of claim 1 wherein in said tetrahalophthalate ester of (ii) R is an alkyl or substituted alkyl of 1 to 10 carbons, A is Br, X is oxygen, p is 0 to 20, and q is 1 to 6.

4. The composition of claim 3 wherein R is $$-CH_2\underset{CH_3}{\overset{|}{CH}}-OH, -CH_3, -C_2H_5, -C_3H_7, -C_4H_9; -C_6H_{13},$$

$$-C_4H_9 \ -CH_6H_{13}, -C_8H_{17} \ -CH_2\underset{C_2H_5}{\overset{|}{CH}}C_4H_9, -C_{10}H_{21}; R^1 \text{ is}$$

$$CH_3, C_2H_5, C_4H_9, H, -C_3H_7, -C_6H_{13}, -C_8H_{17},$$

$$-CH_2-\underset{C_2H_5}{\overset{|}{CH}}C_4H_9, -C_{10}H_{21}, \text{ or}$$

[structure: HO—CH(CH3)CH2OC(=O)—tetrabromophenyl—C(=O)—, and q = 1.]

5. The compositions of any one of claims 1, 2, 3, or 4 wherein (ii) includes other brominated or chlorinated flame retardants or mixtures thereof.

6. The composition of claim 5 wherein said brominated flame retardants are selected from the group consisting essentially of

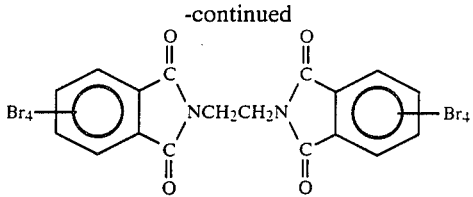

-continued

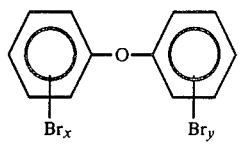

(x + y = 5-8)

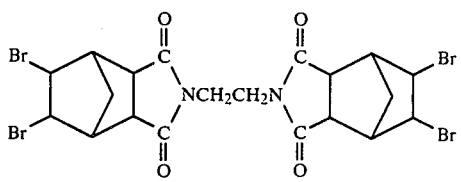

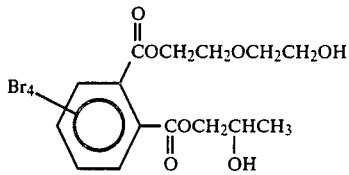

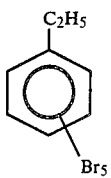

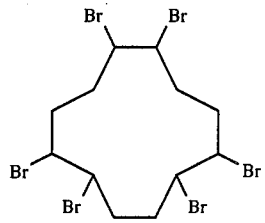

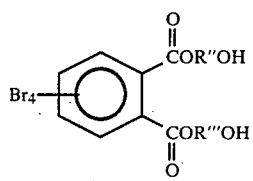

where R″ and R‴ are alkylene or substituted alkylene

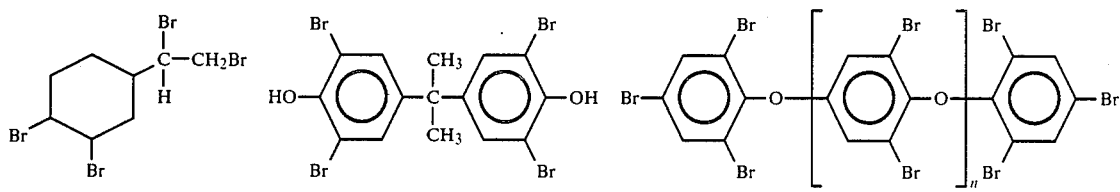

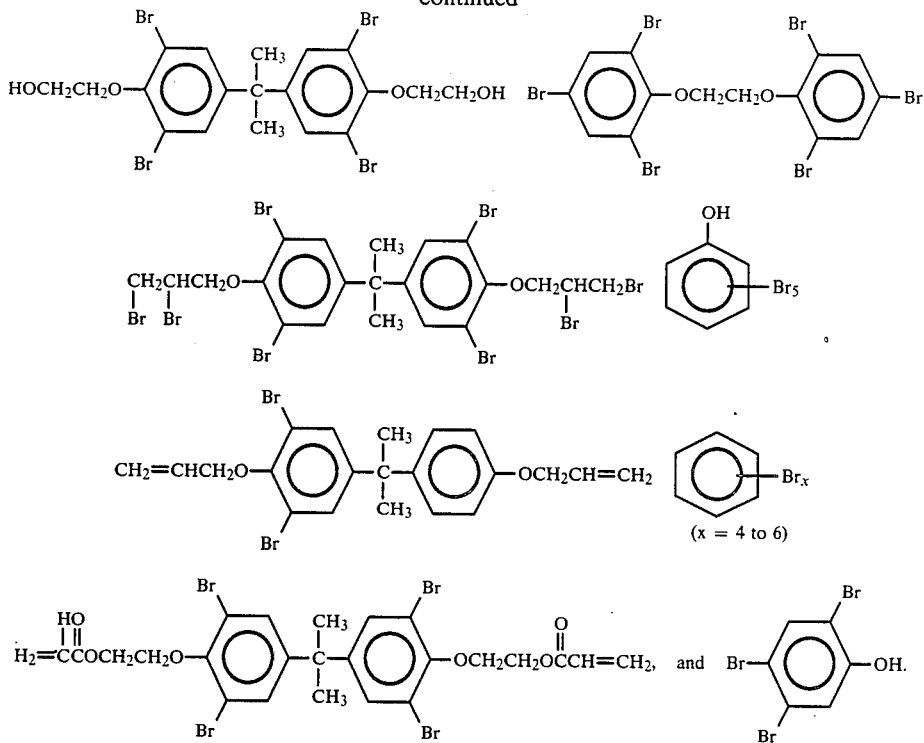

-continued

7. The composition of claim 1 wherein the homopolymer is prepared by polymerizing the repeatable homopolymer unit in the presence of a liquid or gaseous blowing agent and said agent has a boiling point that is below the softening point of the polystyrene and does not dissolve said polystyrene.

8. The composition of claim 7 wherein said blowing agent is selected from the group consisting of one or more of propane, butane, pentane, hexane, heptane, cyclohexane, methyl chloride, dichlorodifluoroethane, 1,1,2 trifluoroethane, and 1,1,2 trichloroethane.

9. The foamed composition of any one of claims 1, 2, 3, or 4.

10. The composition of claim 6 wherein the homopolymer is prepared by polymerizing the repeatable homopolymer unit in the presence of a liquid or gaseous blowing agent and said agent has a boiling point that is below the softening point of the polystyrene and does not dissolve said polystyrene.

11. The composition of claim 10 wherein said blowing agent is selected from the group consisting of one or more of propane, butane, pentane, hexane, heptane, cyclohexane, methyl chloride, dichlorodifluoroethane, 1,1,2 trifluoroethane, and 1,1,2 trichloroethane.

* * * * *